United States Patent
Burris et al.

(10) Patent No.: US 11,328,567 B2
(45) Date of Patent: May 10, 2022

(54) FRICTIONLESS SECURITY PROCESSING (71) Applicant: NCR Corporation, Atlanta, GA (US)

(72) Inventors: Matthew Robert Burris, Atlanta, GA (US); Christopher John Costello, Suwanee, GA (US); Gregory Joseph Hartl, Atlanta, GA (US); Sudip Rahman Khan, Decatur, GA (US)

(73) Assignee: NCR Corporation, Atlanta, GA (US)

(*) Notice: Subject to any disclaimer, the term of this patent is extended or adjusted under 35 U.S.C. 154(b) by 351 days.

(21) Appl. No.: 16/696,788

(22) Filed: Nov. 26, 2019

(65) Prior Publication Data
US 2021/0158675 A1 May 27, 2021

(51) Int. Cl.
G08B 13/196 (2006.01)
G07C 9/23 (2020.01)
G06K 9/00 (2006.01)
G07C 9/00 (2020.01)
H04W 4/021 (2018.01)
H04W 4/02 (2018.01)

(52) U.S. Cl.
CPC ... G08B 13/19652 (2013.01); G06K 9/00369 (2013.01); G06K 9/00778 (2013.01); G07C 9/00904 (2013.01); G07C 9/23 (2020.01); G08B 13/19613 (2013.01); G08B 13/19673 (2013.01); H04W 4/021 (2013.01); H04W 4/023 (2013.01)

(58) Field of Classification Search
CPC .......... G06K 9/00369; G06K 9/00771; G06K 9/00778; G06Q 10/063114; G06Q 10/06398; G07C 1/10; G07C 2209/63; G07C 9/00904; G07C 9/23; G07C 9/28; G07C 9/33; G07C 9/38; G08B 13/19613; G08B 13/19652; G08B 13/19673; H04N 7/18; H04W 4/021; H04W 4/023
See application file for complete search history.

(56) References Cited

U.S. PATENT DOCUMENTS

| 10,555,178 B1* | 2/2020 | Bach | H04W 4/023 |
| 2004/0104266 A1* | 6/2004 | Bolle | G06F 21/645 |
| | | | 235/382 |
| 2017/0054735 A1* | 2/2017 | Moretti | G06F 3/14 |
| 2017/0093959 A1* | 3/2017 | Funabashi | H04L 67/1074 |

* cited by examiner

Primary Examiner — Dakshesh D Parikh
(74) Attorney, Agent, or Firm — Schwegman, Lundberg & Woessner (57) ABSTRACT

A first device is detected within a geofenced area of an establishment. A second device is determined to be within the geofenced area. A first individual associated with the first device is instructed to enter the establishment and complete a first portion of opening security procedures associated with an opening of the establishment. Upon completion of the first portion, a second individual associated with the second device is instructed to enter the establishment for a second portion of the opening security procedures. The first individual and the second individual are monitored through video feeds during the first portion and the second portion of the opening security procedures for compliance with the opening security procedures.

13 Claims, 4 Drawing Sheets

FRICTIONLESS SECURITY PROCESSING

BACKGROUND

Nearly every enterprise has very specific security procedures with respect to opening and closing the enterprise. Some enterprises require more intensive and cumbersome procedures.

For example, banks require at least two individuals when opening a branch. These procedures are put in place to ensure that an employee is not kidnapped during an opening. Two employees arrive at a bank, one goes into the bank while the other remains in the parking lot in his/her car. This ensures that if the intruders are lying in wait within the branch that the second employee can notify the authorities and be capable of escaping. The first employee unlocks the door to the branch, immediately locks the door upon entering the branch, and disarms the security alarms of the branch. Meanwhile, the second employee scans the parking lot for suspicious individuals or activity. A security sweep is performed by the employee inside the branch, and the first employee holds a specific sign up through a window of the branch or performs some other type of signaling to the employee in the parking lot so at to notify that employee that is safe to enter the branch. The second employee enters the branch and locks the door behind him. Additional security sweeps are performed, and the bank is prepared for opening with cash drawers, etc. the branch is then opened for business.

As is apparent, the branch security procedures are not limited to just areas within the branch; rather, the procedures extend to areas proximate to the branch on the outside, such as the parking lot and surrounding external areas. These procedures are necessary to protect the branch staff from threats that may be present both inside and outside the branch during the opening of the branch.

Opening and closing of any enterprise poses unique challenges to ensuring the safety of the employees. It is during these times that the enterprise is most vulnerable. Should a security issue arise during this time, it is imperative that authorities be notified as soon as possible.

SUMMARY

In various embodiments, methods and a system for frictionless security processing are presented.

According to an embodiment, a method for frictionless security processing is presented. A first device of a first individual is detected within a geofenced area of an establishment. A second device of a second individual is determined to be within the geofenced area of the establishment. An entry instruction is pushed to the first device and the second device indicating that the first individual is authorized to enter the establishment. The first individual is monitored through video feeds while the first individual is within the establishment with respect to opening security procedures taken by the first individual once inside the establishment. A second entry instruction is sent to the second device upon determining that a first portion of the opening security procedures taken by the first individual have been completed successfully.

DETAILED DESCRIPTION

Figure 1:
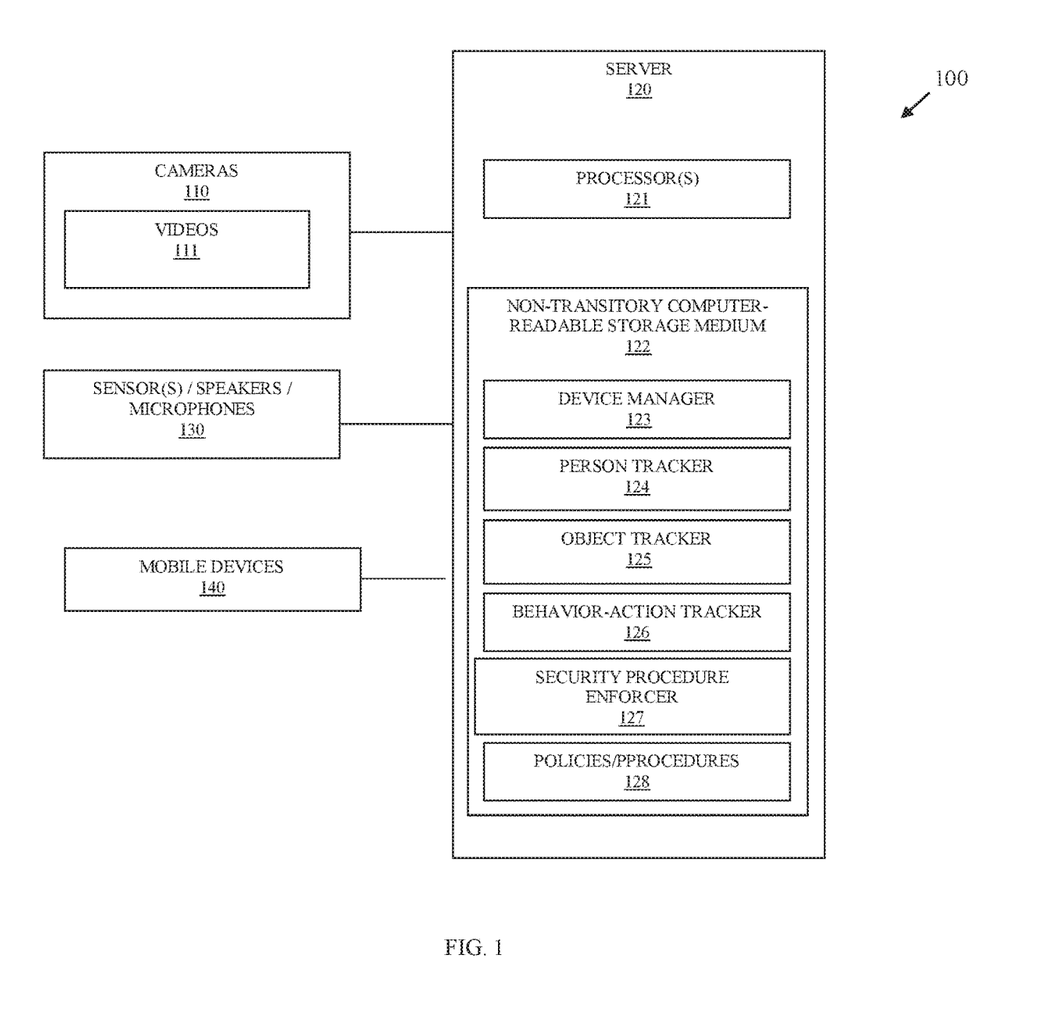
FIG. 1 is a diagram of a system for frictionless security processing, according to an example embodiment.

FIG. 1 is a diagram of a system 100 for frictionless security processing according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless security processing, presented herein and below.

As used herein and below, the terms "user," "personnel," "actor," "person," "individual," and "subject" may be used interchangeably and synonymously. The terms refer to an individual detected within a secure area or a monitored area where one or more secure assets are present.

The phrases "security procedures" and "security policies" may be used synonymously and interchangeably herein and below. These phrases comprise, inter alia, business rules associated with opening or closing an establishment.

An "object" refers to a secure asset or structure located within the establishment. The object may include drawers, computers, keys, cash, checks, tables, security panels, chairs, windows, notary stamps, doors, documents, terminals, countertops, shelving, items being sold within the establishment, etc. that are being monitored within the image frames of one or more videos provided in video feeds.

System 100 includes a plurality of cameras 110 that capture time-stamped videos of persons and objects outside and on a premise of an establishment and within the establishment. System 100 includes mobile devices 140 of employees or agents of the establishment. Moreover, system 100 also includes server 120. Server 120 includes executable instructions that execute on one or more hardware processors 121 of server 120 from a non-transitory computer-readable storage medium 122 as: device manager 123, person tracker 124, object tracker 125, behavior-action tracker 126, and security procedure enforcer 127. Non-transitory computer-readable-storage medium 122 also includes security policies/procedures 128 (security policies 128).

Security policies 128 represent a data structure comprising and embodying business security rules for opening and closing an establishment. Security policies 128 include statements of area identifiers, asset/object identifiers, action identifiers, behavior identifiers, security role identifiers for security roles and responsibilities, and conditions that defines rules. Each rule identifying a task required for a portion of a business opening or closing security procedure. Tasks can be required or can be defined as impermissible. The sequence of the tasks may also be defined within the conditions for the rules. Each rule may also include a resource identifier or a processing action that is to be processed when a given rule is violated. The resource associated with the resource identifier may be an automated application, a system, or an electronic contact address of an individual.

It is to be noted that there may be multiple servers 120, such that the different elements 123-127 may execute on a same server 120 or multiple different servers 120 networked together.

Cameras 110 are preconfigured to capture videos 111 of areas that are inside and outside the establishment based on the field-of-view of the lenses of cameras 110. Some of cameras 110 may capture images 111 representing portions of a different area than a different one of the cameras 110 captures video 111 for. That is, each video 111 can include frames that may overlap multiple ones of the defined areas.

In an embodiment, the cameras 110 can be situated at different angles and heights within the areas where they are located. Some cameras 110 may be at waist level, chest level, or head level to an average sized person and directed in different directions upward or downward slightly for purposes of capturing the eyes of individuals within the room. Additionally, there one or more overhead cameras 110 both inside and outside the establishment. Some cameras 110 may be specifically calibrated to capture eyes and faces of the individuals.

Initially, cameras 110 are situated in locations throughout the establishment and one or more cameras 110 may situated on the outside of the establishment to capture the egress and ingress point of the establishment and optionally to capture a parking lot associated with the establishment Each camera lens configured to cover one or more predefined areas both inside and outside the establishment.

Furthermore, metadata is assigned to each camera 110 to include a unique camera identifier, a location identifier (representing the physical location that camera 110 is situated), and one or more area identifiers (representing the predefined areas that the lens of camera 110 captures in the video 111).

Mobile devices 140 include mobile applications that minimally reports device locations of the devices 140 to device manager 123 using that device's location services. Optionally, mobile applications receive messages and notifications from device manager 123. Device manager 123 may also send text messages to devices 140 and/or in-app messages to the mobile applications.

Device manager 123 is initiated based on a schedule associated with opening and closing the establishment. The schedule is a data structure that includes an opening time and a closing time along with employee identifiers associated with opening and closing security procedures on a given calendar date. Furthermore, the employee identifiers are linked to mobile device identifiers associated with mobile devices 140 operated by the employees.

Device manager 123 begins requesting or listening for mobile device locations being reported by the mobile applications of mobile devices 140 at a configurable period of time before a scheduled opening time for the establishment. Device manager 123 is preconfigured with geofenced area associated with a parking lot or outside premises of the establishment. At the preconfigured period of time before the scheduled opening time, device manager 123 detects with a first one of the mobile device's is reporting a current real-time device location within the geofenced area. If at least one second device 140 is not yet also within the geofenced area, device manager 123 determines an estimated arrival time of the second device 140 based on its currently reported device location, a route calculated to travel to the geofenced area, and current traffic associated with the route. The estimated arrival time is pushed as a notification to the first device 140 that was detected within the geofenced area already. The notification may be sent by text or via an in-app message to the first device 140.

Once device manager 123 determines the both devices 140 are within the geofenced area, device manager 123 sends a notification to initiate opening security procedures for the establishment to security-procedure enforcer 127 along with mobile device identifiers for the mobile devices 140. It is to be noted that security-procedure enforcer 127 may have access to the schedule and device identifiers for the employees, such that the device identifiers do not have to be included with the notification sent by device manager 123.

Security-procedure enforcer 127 instructs trackers 124-126 to being monitoring the videos 111 (video feeds 111) streamed from cameras 110 at the establishment. Security-procedure enforcer 127 obtains the opening security policies 128 for the establishment. Next, device manager 127, in accordance with the security policy 128, randomly or as identified in the security policy 128, selects a first device 140 associated with a first employee. The second device 140 is associated with a second employee. The selection determines roles of the first and second employees during the opening of the establishment. The security policy 128 associated with the opening security procedure identifies action identifies for actions that must be completed for each role identifier.

Security-procedure enforcer 127 sends the roles and/or action identifiers to mobile devices 140 (again this can be via text message or an in-app message). The first individual/employee selected by the security-procedure enforcer 127 is then monitored from the video feeds 111 by person tracker 124 using a bounding box or region of interest within pixels of the image frames from the video feeds 111 to track locations of the first employee relative to the ingress point of the establishment and while the first employee is located within the establishment and performing a first portion of the opening security procedures. Object tracker 125 monitors the structures and assets within the establishment via bounding boxes or regions of interest within pixels of the image frames for the video feeds 111.

Behavior-action tracker 127 utilizes the bounding boxes associated with first employee and the objects to perform more detailed pixel analysis on facial features of the first employee and identify behaviors identified by specific behavior identifiers. Moreover, location information within the pixels for the bounding boxes of the first employee and the objects are used by behavior-action tracker to identify actions that corresponding to action identifiers.

Security-procedure enforcer 127 utilizes location information of the bounding boxes for the first employee within the establishment against known locations within the establishment with the object identifiers provided by object tracker 125, action identifiers provided by behavior-action tracker 126, and behavior identifiers provided by tracker 126 to evaluate the security policies 128 and determine that tasks are being performed in the correct order defined in policies 128.

The security-procedure enforcer 127 plugs in the identifiers into the policies 128 and evaluates the conditions to determine whether tasks are being completed for the first portion of the opening security procedures of the establishment. Once evaluation indicates that the first portion has been successfully completed, security-procedure enforcer 127 sends a notification to second device 140 indicating that the second employee may now enter the establishment for completion of a second portion of the opening security procedures.

Trackers 124-127 then provides identifiers and location information for both the first employee and the second employee within the establishment, and security-procedure enforcer 127 determines from the security policies 128 when the second portion of the opening security procedures are completed.

Security-procedure enforcer 127 may also time and date stamp entries along with action identifiers, behavior identifiers, and task identifiers associated with rules of the policies 128 in a security log.

In an embodiment, security-procedure enforcer 127 sends real-time updates to second device 140 as rules/tasks are completed by the first employee during performance of the first portion of the opening security procedures.

Security-procedure enforcer 127 also checks from identifiers returned by person tracker 124 whether at any point someone other than the first employee during the first portion of the opening security procedures or at any point someone other than the first employee and the second employee are present within the establishment during the second portion of the opening security procedures. If someone is detected, security-procedure enforcer 127 raises an alarm (silent) to a security system to dispatch authorities to the establishment. An alert may also be raised during the first portion and/or second portion when the first employee or the second employee are identified as taking impermissible actions. The alert may be processed by a security system in accordance with alert rules.

Moreover, the first and second employees are evaluated from the video feeds 111 for behaviors associated with nervousness, agitation, and/or aggression by behavior-action tracker 126. Still further, objects carried into or possessed by first employee and second employee are evaluated by object tracker 125, such that if guns or impermissible objects are brought into establishment, security-procedure enforcer 127 may raise an alarm.

The system 100 may further be processed in a similar manner for closing security procedures in accordance with different security policies 128 evaluated by security-procedure enforcer 127.

Each camera 110 provides time stamp and image-frame stamped video 111 to server 120. This video 111 can be streamed over a wired or wireless connection between cameras 110 and server 120 to a commonly accessible storage area on server 120 that is accessible to person tracker 124, object tracker 123, action tracker 126, and audit-notification manager 127.

Each accessible video frame of each video feed 111 includes its metadata (minimally including what was discussed above) with its video frame on the server 120.

One now appreciates how system 100 can be used as a real-time visual-based frictionless security enforcement mechanism. The employees are not required to make entries in any security log; although in some cases this may still be required to cross check frictionless security system 100. Moreover, non-compliant actions, behaviors, and security threats may cause alarms of different levels of severity as defined in security policies 128. Threats are automatically identified, and a security system is alerted to dispatch authorities when needed.

A variety of scenarios are possible with system 100 some of which but not all of which are now discussed.

Person tracker 124 may be equipped with biometric recognition, such that facial features of the individuals being tracked can be derived from the pixels of the video frames and matched to a registered individual or the enterprise. An enterprise identifier for the individual may then be recorded within the security log with the security log entries. For example, facial recognition may ensure that the first employee and second employee are the expected authorized employees performing the first portion and the second portion of the opening and/or closing security procedures of the establishment.

It is noted that other biometric features may be used as well, such as and my way of example only, a fingerprint provided by a security system indicating that the individual was authenticated for access to the establishment, a retina scan, a digit distance and length measurement, a palm reader, a voice print (captured by a microphone), etc. Additionally, features from the video feeds 111 do not have to only include facial features and can include any combination of features or a single set of features associated with the individuals: gait, extremity length, height, and/or facial features.

In an embodiment, security-procedure enforcer 127 listens for keywords spoken by first employee or second employee captured from microphones 130. When a keyword associated with distress is spoken, security-procedure enforcer 127 raises a silent alarm and may notify second employee during the first portion where second employee is not yet within the establishment.

Enforcer 127 may utilize a variety of sensors 130 after individuals have left or entered different rooms of the establishment during the first portion and/or second portion of the opening or closing security procedures. Enforce 127 may also utilizes sensors 130 to check that doors to rooms or drawers are in an appropriate state of unlocked or locked.

In an embodiment, enforcer 127 includes a reporting interface for automatically or custom generating reports for opening or closing security procedures, secure assets, policy violations, specific individuals, etc.

The above-noted embodiments and other embodiments are now discussed with reference to FIGS. 2-4.

Figure 2:
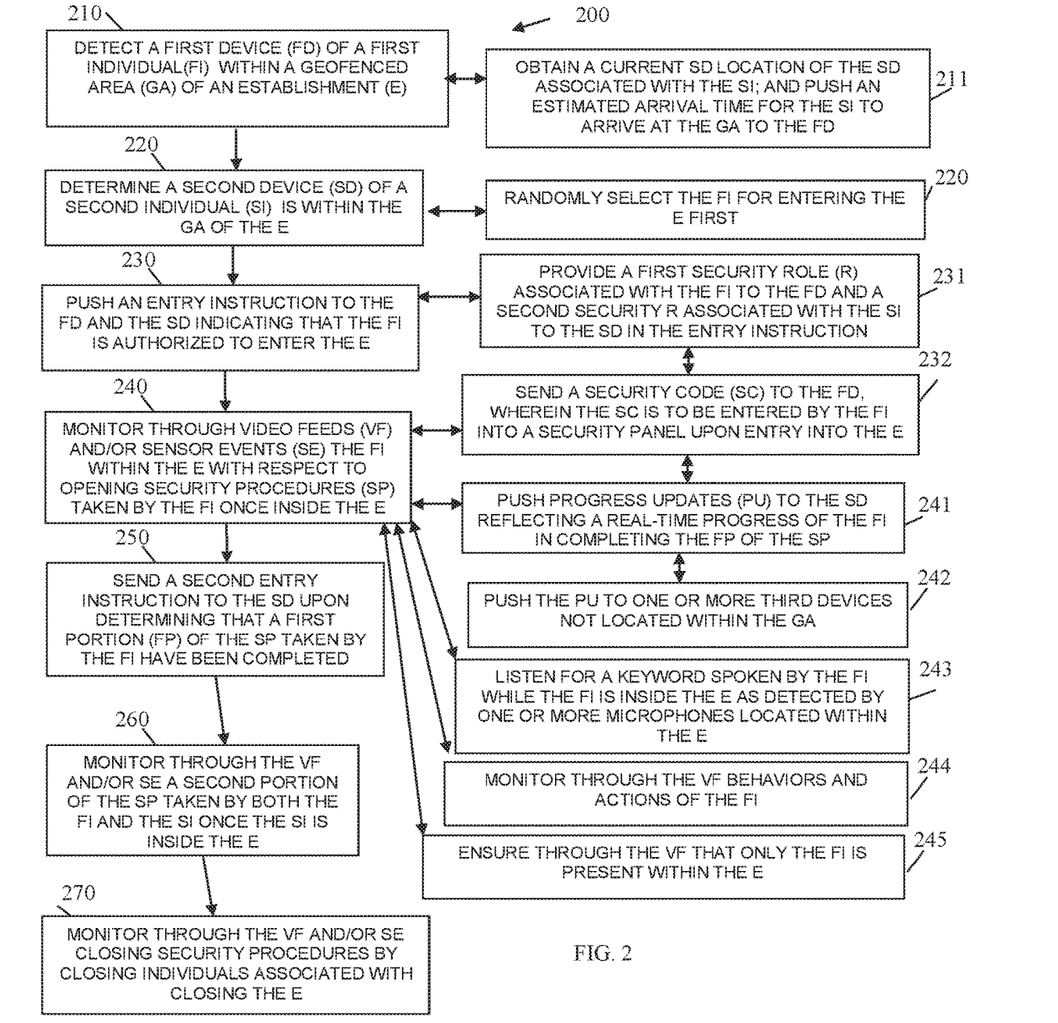
FIG. 2 is a diagram of a method for frictionless security processing, according to an example embodiment.

FIG. 2 is a diagram of a method 200 for frictionless security processing, according to an example embodiment. The software module(s) that implements the method 200 is referred to as a "frictionless opening and closing manager." The frictionless opening and closing manager is implemented as executable instructions programmed and residing within memory and/or a non-transitory computer-readable (processor-readable) storage medium and executed by one or more processors of a device. The processor(s) of the device that executes the frictionless opening and closing manager are specifically configured and programmed to process the frictionless opening and closing manager. The frictionless opening and closing manager may have access to one or more network connections during its processing. The network connections can be wired, wireless, or a combination of wired and wireless.

In an embodiment, the device that executes the frictionless opening and closing manager is server 120. In an embodiment, server 120 is a cloud-based server, a local-area network (LAN)-based server, or a wide-area network (WAN) server.

In an embodiment, the frictionless opening and closing manager is all or some combination of: device manager 123, person tracker 124, object tracker 125, behavior-action tracker 126, and/or enforcer 127.

At 210, the frictionless opening and closing manager detects a first device of a first individual within a geofenced area of an establishment. The first device reports its location using the first device's location services.

In an embodiment, at 211, the frictionless opening and closing manager obtains a current second device location of a second device associated with a second individual and the frictionless opening and closing manager pushes an estimated arrival time for the second individual to the geofenced area to the first device. The second device reports its location using the second device's location services.

At 220, the frictionless opening and closing manager determines a second device of the second individual is within the geofenced area of the establishment.

In an embodiment, of 221, the frictionless opening and closing manager randomly selects the first individual for entering the establishment first.

At 230, the frictionless opening and closing manager pushes an entry instruction to the first device and the second device indicating that the first individual is authorized to enter the establishment while the second individual is to wait in a vehicle of a parking lot of the establishment.

In an embodiment, at 231, the frictionless opening and closing manager provides a first security role associated with the first individual to the first device and a second security role associated with the second individual in the entry instruction.

In an embodiment of 231 and at 232, the frictionless opening and closing manager sends a security code to the first device. The security code is to be entered by the first individual upon entry into the establishment.

At 240, the frictionless opening and closing manager monitors, through video feeds and/or sensor events, the first individual within the establishment with respect to opening security procedures taken by the first individual once inside the establishment. In an embodiment, the sensor events are generated by sensors from within the establishment, such as motion sensors, sensors configured to report the first individual performed a task at a monitor, etc. In an embodiment, the first individual is monitored through both video feeds and sensor events.

In an embodiment of 232 and 240, at 241, the frictionless opening and closing manager pushes progress updates to the second device that reflects a real-time progress of the first individual in completing a first portion of the opening security procedures.

In an embodiment of 241 and at 242, the frictionless opening and closing manager pushes the progress updates to one or more third devices that are not located within the geofenced area.

In an embodiment, at 243, the frictionless opening and closing manager listens for a keyword spoken by the first individual while the first individual is inside the establishment as detected by one or more microphones located within the establishment.

In an embodiment, at 244, the frictionless opening and closing manager monitors, through the video feed, behaviors and actions of the first individual.

In an embodiment, at 245, the frictionless opening and closing manager ensures, through the video feeds, that only the first individual is presenting within the establishment.

At 250, the frictionless opening and closing manager sends a second entry instruction to the second device upon determining that a first portion of the security procedures taken by the first individual has been completed by the first individual.

In an embodiment, at 260, the frictionless opening and closing manager monitors, through the video feeds and/or sensor events, a second portion of the opening security procedures taken by both the first individual and the second individual once the second individual is inside the establishment.

In an embodiment, at 270, the frictionless opening and closing manager monitors, through the video feeds and/or the sensor events, closing security procedures by closing individuals associated with closing the establishment.

Figure 3:
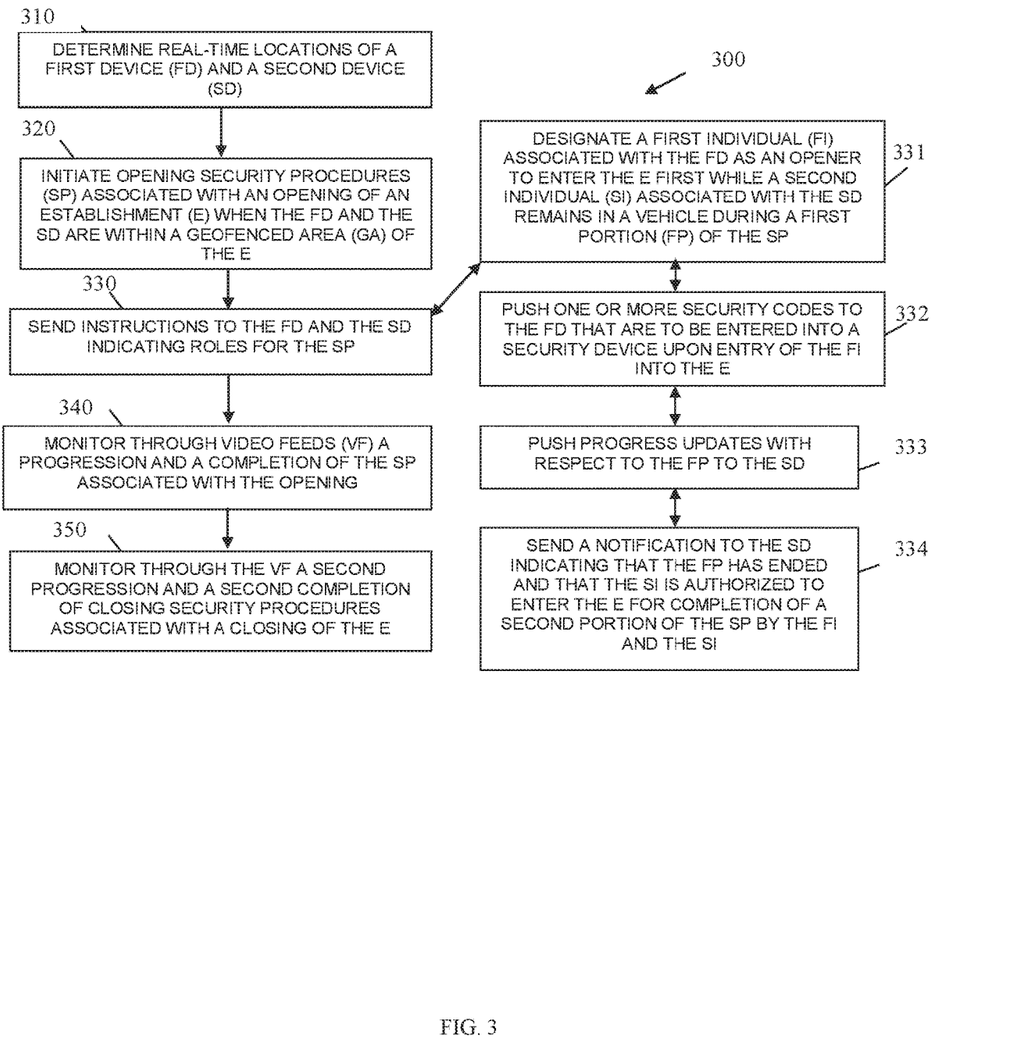
FIG. 3 is a diagram of another method for frictionless security processing, according to an example embodiment.

FIG. 3 is a diagram of another method 300 for frictionless security processing, according to an example embodiment. The software module(s) that implements the method 300 is referred to as an "frictionless security manager." The frictionless security manager is implemented as executable instructions programmed and residing within memory and/or a non-transitory computer-readable (processor-readable) storage medium and executed by one or more processors of a device. The processors that execute the frictionless security manager are specifically configured and programmed to process the frictionless security manager. The frictionless security manager may have access to one or more network connections during its processing. The network connections can be wired, wireless, or a combination of wired and wireless.

In an embodiment, the device that executes the frictionless security manager is the server 120. In an embodiment, the server 120 is a cloud processing environment, a LAN server, or a WAN server.

In an embodiment, the frictionless security manager is all of or some combination of: device manager 123, person tracker 124, object tracker 125, behavior-action tracker 126, enforcer 127, and/or the method 300.

The frictionless security manager presents another and, in some ways, enhanced processing perspective of the method 200 discussed above.

At 310, the frictionless security manager determines real-time locations of a first device and a second device.

At 320, the frictionless security manager initiates opening security procedures associated with opening an establishment when the first device and the second device are determined to be within a geofenced area of the establishment based on the real-time locations.

At 330, the frictionless security manager sends instructions to the first device and the second device indicating roles for the opening security procedures.

In an embodiment, at 331, the frictionless security manager designates a first individual associated with the first device as an opener to enter the establishment first while a second individual associated with the second device remains in a vehicle during a first portion of the opening security procedures.

In an embodiment of 331 and at 332, the frictionless security manager pushes one or more security codes to the first device that are to be entered into a security device upon entry of the first individual into the establishment.

In an embodiment of 332 and at 333, the frictionless security manager pushes progress updates with respect to the first portion of the opening security procedures to the second device.

In an embodiment of 333 and at 334, the frictionless security manager sends a notification to the second device indicating that the first portion of the opening security procedures have ended and that the second individual is authorized to enter the establishment for completion of a second portion of the opening security procedures.

At 340, the frictionless security manager monitors, through video feeds, a progression and completion of the opening security procedures associated with the opening of the establishment.

In an embodiment, at 350, the frictionless security manager monitors, through the video feeds, a second progression and a second completion of closing security procedures associated with a closing of the establishment.

Figure 4:
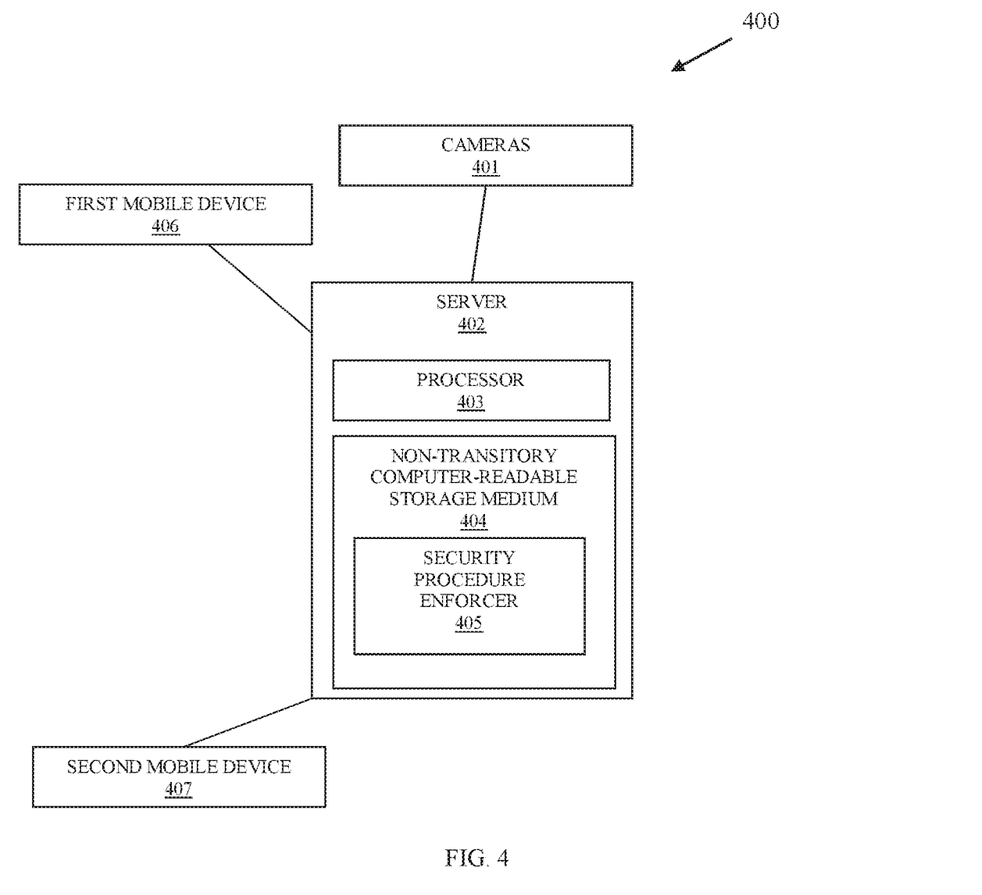
FIG. 4 is a diagram of another system for frictionless security processing, according to an example embodiment.

FIG. 4 is a diagram of a system 400 for frictionless security processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality cameras 401, a server 402, a first mobile device 406, and a second mobile device 407. The server 402 includes at least one hardware processor 403, a non-transitory computer-readable storage medium 404 having executable instructions representing a security procedure enforcer 405.

The security procedure enforcer 405 when executed from the non-transitory computer-readable storage medium 404 on the processor 403 is configured to cause the processor 403 to perform processing comprising: 1) detecting that the first mobile device 406 is within a geofenced area of the establishment; 2) sending an estimated time of arrival to the first mobile device 406 indicating when the second mobile device 407 will arrive in the geofenced area; 3) determining the second mobile device 407 is within the geofenced area; 4) sending a first security role to the first mobile device 406 and a second security role to the second mobile device 407 for performing opening security procedures to open the establishment; 5) monitoring through video feeds the first individual upon entry of the establishment during a first portion of the opening security procedures; 6) sending real-time progression notifications to the second mobile device 407 with respect to performance of the first portion of the opening security procedures by the first individual; 7) sending a notification to the second mobile device 407 indicating that the first portion of the opening security procedures has completed and that the second individual is to enter the establishment for completion of a second portion of the opening security procedures; 8) monitoring through the video feeds the first individual and the second individual during completion of the second portion of the opening security procedures; and 9) logging tasks completed with respect to the first portion and the second portion of the opening security procedures in an audit log.

In an embodiment, the security procedure enforcer 405 when executed from the non-transitory computer-readable storage medium 404 on the processor 403 is configured to further cause the processor 403 to perform additional processing comprising: 10) sending an alert to a security system when a security threat is detected from the video feeds during the first portion or the second portion of the opening security procedures; and 11) monitoring through the video feeds behaviors and actions of the first individual and the second individual during the first portion and the second portion of the opening security procedures.

In an embodiment, the security procedure enforcer 405 is all of or some combination of: device manager 123, person tracker 124, object tracker 125, behavior-action tracker 126, enforcer 127, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting a first device of a first individual within a geofenced area of an establishment;
   sending an estimated time of arrival to the first device indicated when a second device will arrive in the geofenced area;
   determining the second device of a second individual is within the geofenced area of the establishment;
   sending a first security role to the first device and a second security role to the second device for performing opening security procedures to open the establishment;
   monitoring, through video feeds, the first individual upon entry into the establishment with respect to a first portion of the opening security procedures taken by the first individual once inside the establishment;
   sending real-time progression notifications to the second device with respect to performance of the first portion of the opening security procedures by the first individual;
   sending a notification to the second device indicating that the first portion of the opening security procedures has completed and that the second individual is to enter the establishment for completion of a second portion of the opening security procedures;
   monitoring through the video feeds the first individual and the second individual during completion of the second portion of the opening security procedures; and
   logging tasks completed with respect to the first portion and the second portion of the opening security procedures in an audit log.

2. The method of claim 1 further comprising, monitoring through the video feeds closing security procedures by closing individuals associated with closing the establishment.

3. The method of claim 1, wherein sending the estimated time of arrival detecting further includes obtaining a current second device location of the second device associated with the second individual; and pushing the estimated arrival time for the second individual to the first device.

4. The method of claim 1, wherein determining further includes randomly selecting the first individual for entering the establishment first.

5. The method of claim 1, wherein sending the first security role further includes providing the first security role associated with the first individual to the first device and the second security role associated with the second individual to the second device by pushing an entry instruction to the first device and the second device.

6. The method of claim 5, wherein providing further includes sending a security code to the first device, wherein the security code is to be entered by the first individual into a security panel upon entry into the establishment.

7. The method of claim 6, wherein sending the real time progression notifications further includes pushing progress updates to the second device reflecting a real-time progress of the first individual in completing the first portion of the opening security procedures.

8. The method of claim 7, wherein pushing further includes pushing the progress updates to one or more third devices not located within the geofenced area.

9. The method of claim 1, wherein monitoring the first individual upon entry further includes listening for a keyword spoken by the first individual while the first individual is inside the establishment as detected by one or more microphones located within the establishment.

10. The method of claim 1, wherein monitoring the first individual upon entry further includes monitoring through the video feeds behaviors and actions of the first individual.

11. The method of claim 10, wherein monitoring the first individual upon entry further includes ensuring through the video feeds that only the first individual is present within the establishment during the first portion of the opening security procedures.

12. A system, comprising:
cameras configured to capture videos outside an establishment and inside the establishment;
a first mobile device associated with a first individual;
a second mobile device associated with a second individual;
a server comprising a processor and a non-transitory computer-readable storage medium;
the non-transitory computer-readable storage medium comprising executable instructions representing a security procedure enforcer;
the security procedure enforcer when executed on the processor from the non-transitory computer-readable storage medium causing the processor to perform processing comprising:
detecting that the first mobile device is within a geofenced area of the establishment;
sending an estimated time of arrival to the first mobile device indicating when the second mobile device will arrive in the geofenced area;
determining the second mobile device is within the geofenced area;
sending a first security role to the first mobile device and a second security role to the second mobile device for performing opening security procedures to open the establishment;
monitoring through video feeds the first individual upon entry of the establishment during a first portion of the opening security procedures;
sending real-time progression notifications to the second mobile device with respect to performance of the first portion of the opening security procedures by the first individual;
sending a notification to the second mobile device indicating that the first portion of the opening security procedures has completed and that the second individual is to enter the establishment for completion of a second portion of the opening security procedures;
monitoring through the video feeds the first individual and the second individual during completion of the second portion of the opening security procedures; and
logging tasks completed with respect to the first portion and the second portion of the opening security procedures in an audit log.

13. The system of claim 12, wherein the security procedure enforcer when executed on the processor from the non-transitory computer-readable storage medium further causing the processor to perform additional processing comprising:
sending an alert to a security system when a security threat is detected from the video feeds during the first portion or the second portion of the opening security procedures; and
monitoring through the video feeds behaviors and actions of the first individual and the second individual during the first portion and the second portion of the opening security procedures.

* * * * *